US012418524B2

(12) United States Patent
Alexander et al.

(10) Patent No.: US 12,418,524 B2
(45) Date of Patent: Sep. 16, 2025

(54) PREVENTING DATA AND HARDWARE LOSS IN PRE-PROVISIONED DEVICES (71) Applicant: Cisco Technology, Inc., San Jose, CA (US)

(72) Inventors: William Sterling Alexander, Durham, NC (US); Wayne Elmer Moorefield, Jr., Midlothian, VA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 152 days.

(21) Appl. No.: 18/495,939

(22) Filed: Oct. 27, 2023

(65) Prior Publication Data
US 2025/0141862 A1 May 1, 2025

(51) Int. Cl.
H04L 9/40 (2022.01)
(52) U.S. Cl.
CPC .......... H04L 63/083 (2013.01); H04L 63/107 (2013.01)
(58) Field of Classification Search
CPC .................. H04L 63/083; H04L 63/107
See application file for complete search history.

(56) References Cited

U.S. PATENT DOCUMENTS

| 2008/0016537 | A1* | 1/2008 | Little | H04W 12/50 725/81 |
| 2013/0125219 | A1* | 5/2013 | Raleigh | H04W 28/02 726/5 |
| 2017/0270517 | A1* | 9/2017 | Vasu | G06Q 20/4018 |
| 2017/0332236 | A1 | 11/2017 | Li et al. | |
| 2020/0112610 | A1 | 4/2020 | Arnberg et al. | |
| 2020/0220865 | A1 | 7/2020 | Finger et al. | |
| 2020/0358766 | A1 | 11/2020 | Wang | |
| 2022/0014512 | A1* | 1/2022 | Raleigh | H04L 63/20 |
| 2022/0191200 | A1 | 6/2022 | Tulshibagwale et al. | |

FOREIGN PATENT DOCUMENTS

CA 2593901 C * 1/2013 ......... H04L 63/0853

OTHER PUBLICATIONS

Apple, "Set up Apple Watch for a Family Member," Apple Support, https://support.apple.com/en-us/HT211768, Retrieved on Oct. 23, 2023, 7 Pages.

* cited by examiner

Primary Examiner — Michael R Vaughan
(74) Attorney, Agent, or Firm — Edell, Shapiro & Finnan, LLC (57) ABSTRACT A method comprises: at a control entity configured to communicate with a network: linking a user identifier of a user having an account for call-related information to a hardware identifier of a device to be sent to the user, to produce linked identifiers; loading on the device a limited use token associated with the user that enables only basic call functions on the device, and prevents the device from accessing the account; determining whether the user possesses the device based on the linked identifiers and proximity pairing of the device with a pairing device; and based on determining, either provisioning the device with a full access token that enables full calling functions on the device and grants full access to the account by the device, or not provisioning the device with the full access token to prevent access to the account.

20 Claims, 9 Drawing Sheets

PREVENTING DATA AND HARDWARE LOSS IN PRE-PROVISIONED DEVICES

TECHNICAL FIELD

The present disclosure relates to deploying pre-provisioned new communication devices to intended end users.

BACKGROUND

In the past, communication devices such as phones, conference room systems, and other hardware may be shipped in an unconfigured state, i.e., in a factory reset state without user, line, or other account provisioning. Sometimes, the unconfigured devices are shipped to information technology (IT) departments. There, IT personnel install, setup, and manage full user provisioning of the communication devices, and then ship the fully configured communication devices to end users. In another scenario, the communication devices are shipped directly to hybrid users at their residences, but the users may be unfamiliar with how to setup the communication devices or the associated user accounts. In yet another scenario, when shipping the communication devices to users, service providers may send factory reset phones to a distribution partner that fully pre-provisions network and account data, to avoid having the users and administrators setup the communication devices. The distribution partner then ships the fully pre-provisioned communication devices directly to the users.

While this may be convenient for the users who receive fully configured communication devices, problems may arise when the communication devices are inadvertently sent to wrong addresses, lost during shipment, or stolen/intercepted. The fully configured communication devices can permit access to personal/sensitive account information, such as recent call history, calendar data, whiteboard information, billing information, and the like. Such access to personal data is a concern when unauthorized users gain possession of the communication devices, and can access the information, which represents unauthorized leakage of personal data.

DETAILED DESCRIPTION

Overview

In an embodiment, a method comprises: at a control entity configured to communicate with a network: linking a user identifier of a user having an account for call-related information to a hardware identifier of a device to be sent to the user, to produce linked identifiers; loading on the device a limited use token associated with the user that enables only basic call functions on the device, and prevents the device from accessing the account; determining whether the user possesses the device based on the linked identifiers and proximity pairing of the device with a pairing device; and based on determining, either provisioning the device with a full access token that enables full calling functions on the device and grants full access to the account by the device, or not provisioning the device with the full access token to prevent full access to the account.

Example Embodiments

Figure 1:
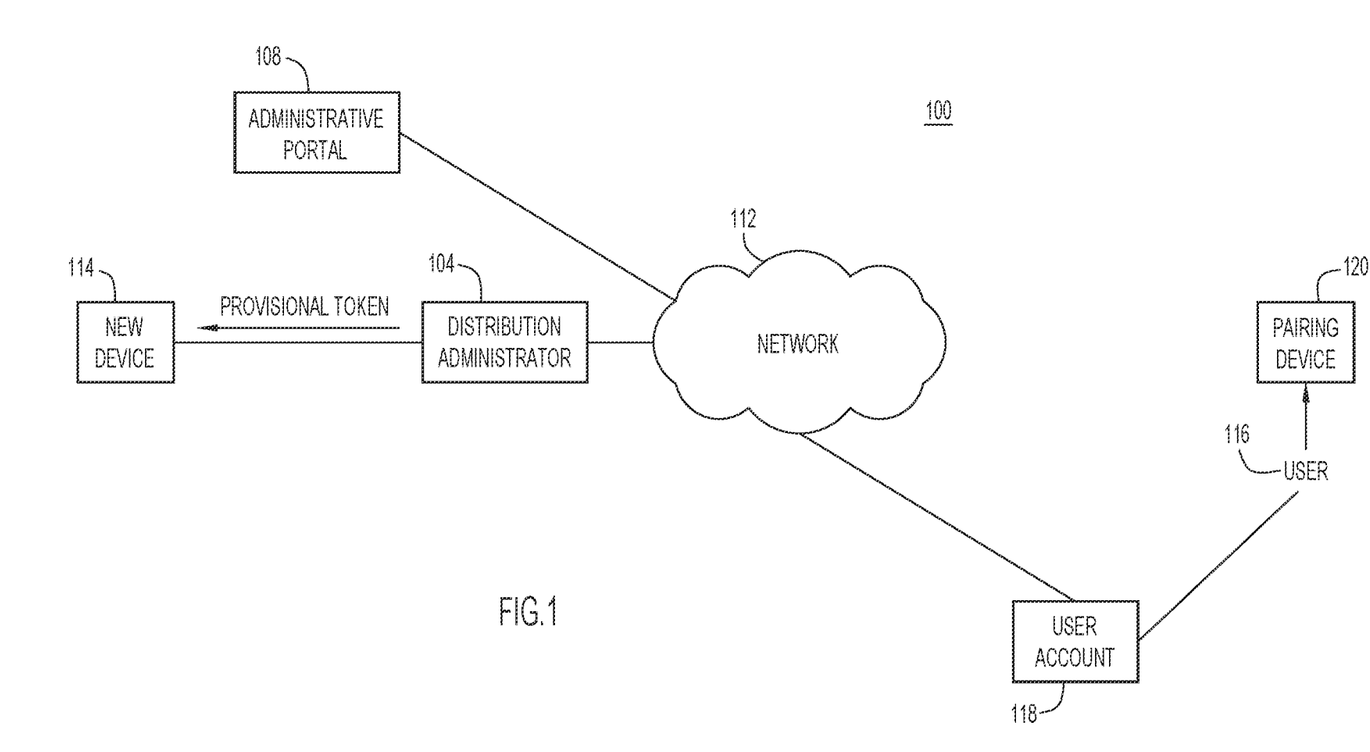
FIG. 1 is a block diagram of a network environment in which pre-provisioning new devices to prevent personal data leakage during deployment of the new devices to intended users may be implemented, according to an example embodiment.

FIG. 1 is a block diagram of an example network environment 100 in which embodiments directed to pre-provisioning new devices to prevent personal data leakage during deployment of the new devices to intended users may be implemented. The embodiments ensure that the intended users receive the new devices with proper user account provisioning and without leaking personal data from user accounts of the intended end users. The embodiments also reduce the possibility that the new devices become lost after shipment. The embodiments achieve the foregoing in a way that limits setup complexity for the intended users, so that the intended users can setup the new devices quickly "out of the box," and then begin using the new devices.

Network environment 100 includes a distribution administrator 104 and an administrative portal 108 each connected to a network 112 and configured to communicate with each over the network. Network 112 may include wide area networks (WANs), such as the Internet, and local area networks (LANs), cellular/mobile networks, Wi-Fi networks, and so on. Network 112 forwards traffic between endpoints in the form of data packets, e.g., Internet Protocol (IP) packets, in accordance with known or hereafter developed protocols, such as the Transmission Control Protocol (TCP)/IP (TCP/IP), and the like.

Distribution administrator 104 serves as an administrator for a device distribution center that stores or warehouses new devices intended for geographically distributed users. Each new device may be a wired and/or wireless network communication end user device, such as a cell phone/smartphone, an IP phone, a video conference device or endpoint, and the like. When initially stored with distribution administrator 104, the new devices are generally not provisioned or configured for users, but are uniquely identified by hardware identifiers, such as hardware serial numbers, programmed into memory of the user devices and accessible through the user devices, as is known. In the example of FIG. 1, the device distribution center warehouses a new device 114 intended for a user 116 (i.e., the "intended user," also referred to as "User1").

User 116 has a user account 118 (i.e., a cloud-based user account) stored in one or more cloud repositories/datacenters accessible through network 112, such as in a datastore associated with distribution administrator 104, administrative portal 108, service providers that submit orders to the distribution administrator to ship new devices to users, corporate entities/enterprise, and the like. User 116 can access user account 118 through new device 114 once the user possesses the new device and administrative portal 108 has enabled the new device for account access according to embodiments presented herein. User account 118 may define call functions on new device 114 and include account information specific to user 116. The account information may be sensitive/private information of user 116, and therefore should only be accessible to the user (i.e., the intended or authorized user), and no other user.

User 116 has access to/operates a pairing device 120 that is local to the user. Pairing device 120 may include a computer device, such as a cell phone/smartphone, a computer (e.g., laptop, tablet, and so on), and may also host conferencing applications (such as Webex), quick response (QR) applications, and ultrasound applications that offer proximity paring capabilities, for example. When operated by user 116, pairing device 120 obtains/acquires information from the user that identifies the user (referred to as a "user identifier"). For example, pairing device 120 may acquire the user identifier (ID) (userID) when the user performs a one-time login to/on the pairing device during which the user provides the userID to the pairing device.

According to embodiments presented herein, new device 114 intended for user 116 is pre-provisioned, shipped to the user, and then enabled for all call functions and full access to user account 118 (access to full/all information of the account), under certain conditions, described below. At a high-level, the embodiments include a pre-delivery phase that occurs before new device 114 is shipped to user 116, shipment of the user device to the user, and a post-delivery phase that occurs after the new device has been shipped to the user. During the pre-delivery phase, distribution administrator 104 and administrative portal 108 (collectively referred to as a "control entity" or a "device deployment manager") interact to pre-provision new device 114 with a provisional token (also referred to a "limited use token") that is linked to/associated with user 116. The limited use token enables basic call functions only on new device 114, and prevents the new device from accessing user account 118.

Figure 2:
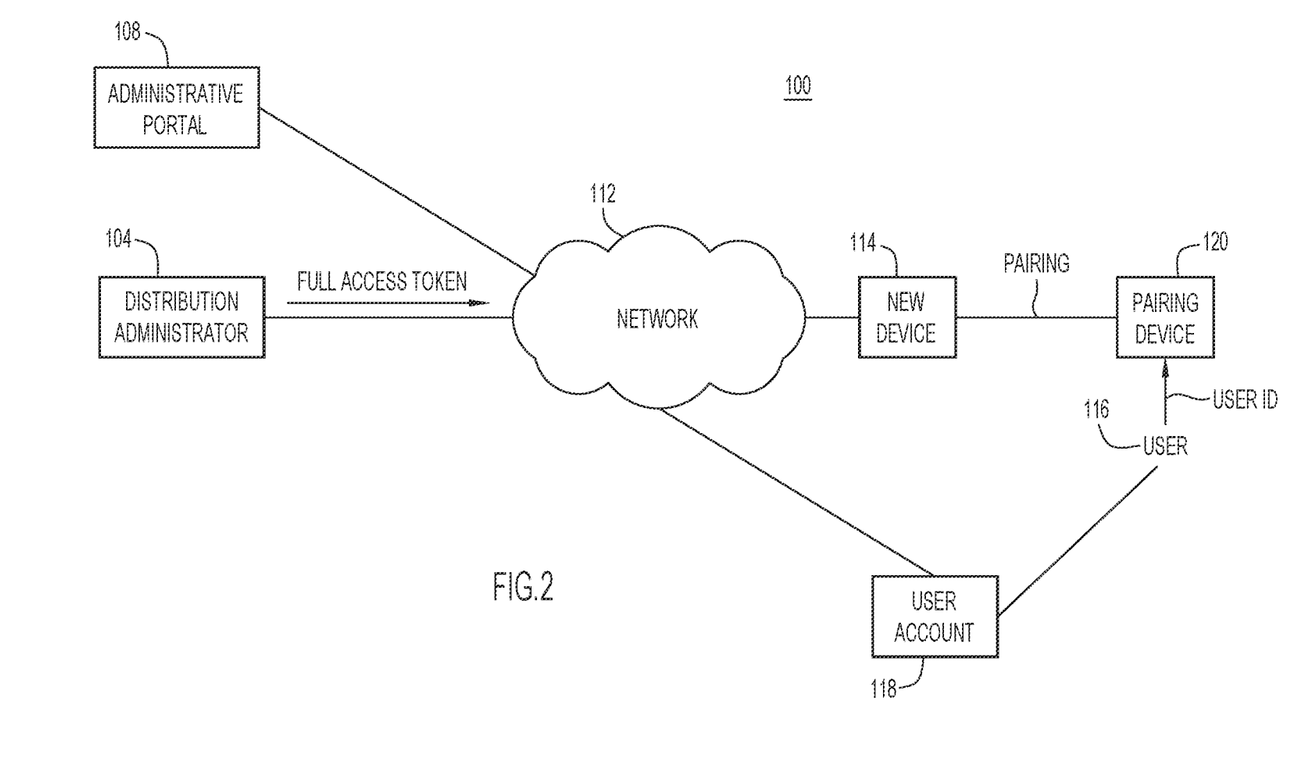
FIG. 2 shows the network environment as configured after shipment of a new device to an intended user of the new device, according to an example embodiment.

After new device 114 has been shipped to user 116, the post-delivery phase ensues. FIG. 2 shows network environment 100 after shipment of new device 114 to user 116. In the post-delivery phase, new device 114 pairs with pairing device 120 as shown in FIG. 2, and acquires information identifying user 116 from the pairing device. Next, new device 114 reports to administrative portal 108 information identifying new device 114 and the information identifying user 116 acquired through pairing with pairing device 120. Administrative portal 108 confirms/verifies that user 116 actually possesses new device 114 based on the reported information, and also verifies that the user is authorized to possess the new device.

Upon confirming the foregoing, administrative portal 108 provisions new device 114 with a full access token (also referred to as a "fully scoped token") that overrides the limited use token. The full access token enables full call functions on new device 114, and grants to the new device full access to user account 118. On the other hand, when the confirmation fails, and administrative portal 108 learns that user 116 does not possess new device 114, administrative portal 108 does not provision the new device with the full access token, which prevents the new device from accessing user account 118 and avoids leakage of account information therein to the new device and any unauthorized user that may be in possession of the new device. Additionally, administrative portal 108 may remotely disable new device 114, and send an alarm to an administrator.

Figure 3:
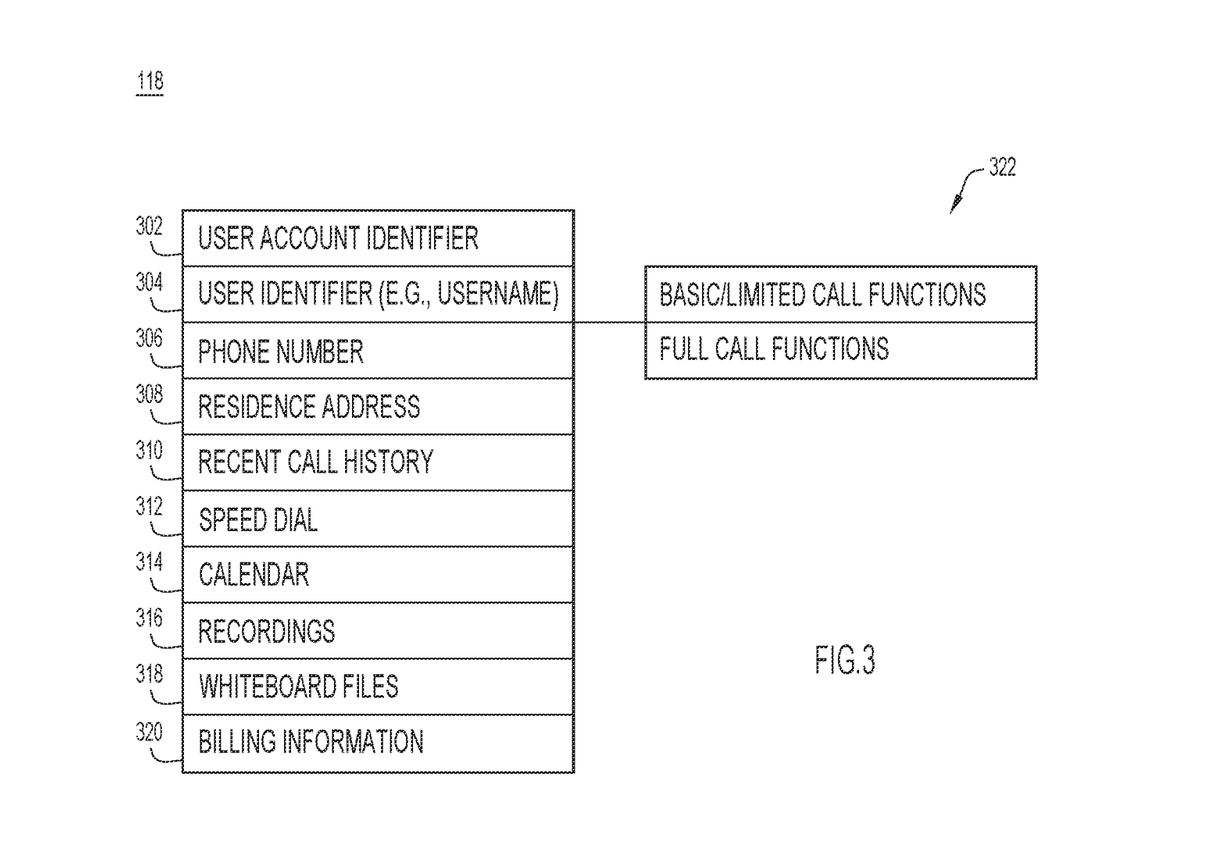
FIG. 3 is an illustration of account information stored in a user account for the intended user of the new device, according to an example embodiment.

FIG. 3 is an illustration of user account 118, according to an embodiment. User account 118 includes a user account identifier 302, a userID 304 (e.g., a username and/or user email address, and so on), a phone number 306, a residence address 308, recent call history 310 (e.g., a list of recently called/received phone numbers), speed dial 312, calendar 314 (e.g., scheduled meetings and participants), recordings 316 (e.g., conference call recordings), whiteboard files 318, and billing information 320 (e.g., billing account information, usage, and so on). In addition, user account 118 may include call definitions 322 that define basic call functions (e.g., incoming and outgoing calling only for certain phone numbers), and full call functions (e.g., unlimited incoming and outgoing calling for unlimited phone numbers).

FIGS. 4A-4D are a diagram of example transactions 400 performed in network environment 100 to pre-provision, ship, and post-shipment provision (i.e., fully configure/enable) new device 114 for user 116 (User1—the intended user). Transactions 400 (which also include operations) include interactions between distribution administrator 104 ("DistributionAdmin"), administrative portal 108 ("AdminPortal"), new device 114, user 116 (i.e., intended/authorized User1), and a user 401 (also referred to as "User2"). User2 is an unintended/unauthorized user. In FIGS. 4A-4D, "User1" and "User2" may refer to the individuals User1 and User2 and/or pairing devices operated by the individuals, depending on context.

Figure 4A:
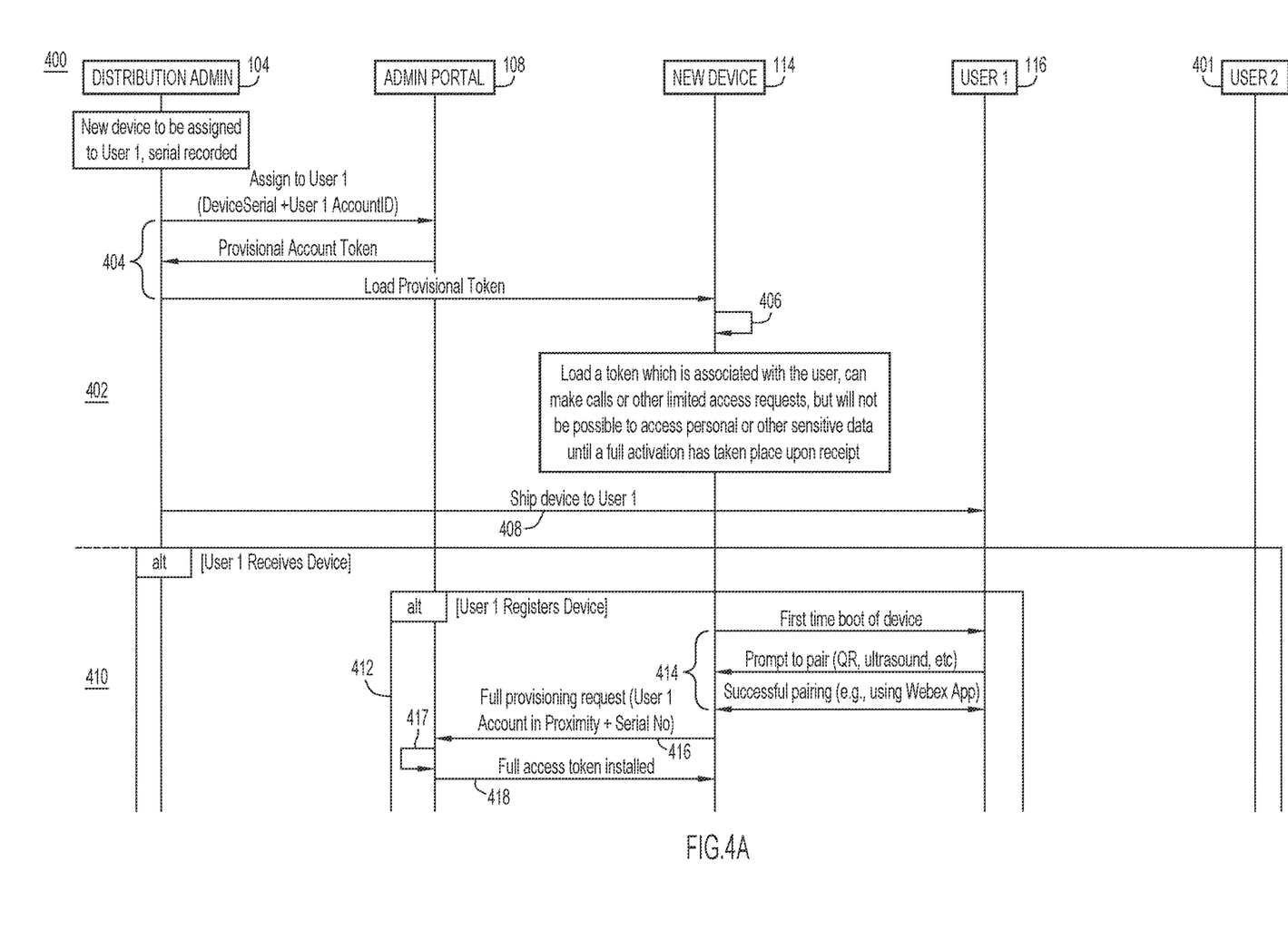
FIGS. 4A, 4B, 4C, and 4D collectively represent a diagram of transactions performed in the network environment to pre-provision, ship, and post-shipment provision the new device for the intended user, according to an example embodiment.

With reference to FIG. 4A, transactions 400 begin with the following pre-shipment/pre-provisioning transactions 402. At 404, upon receiving (e.g., from a service provider) an order to assign new device 114 to User1, distribution administrator 104 provides to administrative portal 108 a hardware ID (e.g., hardware serial number) of new device 114 and a userID of User1. The userID may be any of a username, email address, and a user account ID of User1. In response, distribution administrator 104 links/associates the userID to the hardware ID to form a linked tuple of the identifiers. For example, distribution administrator 104 stores the userID and the hardware ID together in memory with address pointers to each other. The foregoing operation links/associates new device 114 to User1 (i.e., to the identity of User1) at administrative portal 108.

Administrative portal 108 provides to distribution administrator 104 a provisional/limited use token associated with/linked to User1, as described above. In response, distribution administrator 104 installs/loads the provisional token on new device 114. For example, administrative portal may program new device 114 with the provisional token through a communication/configuration port of the new device. Responsive to installation of the provisional token, at 406, new device 114 becomes provisionally activated, meaning that the new device can perform basic call functions, and may provide limited status to administrative portal 108, but cannot access user account 118. The basic call functions may be limited to receiving phone calls, calling an emergency service number, and calling a preloaded IT help line for user support for activating the device, for example. Distribution administrator 104 may also install on new device 114 a pairing application that may be invoked to pair the new device with pairing device 120, as described below.

At 408, distribution administrator 104 ships new device 114 to User1. Post-shipment provisioning transactions are described below.

The post-shipment provisioning transactions include first alternative transactions 410 that occur when User1 (the intended user) receives new device 114. First alternative transactions 410 include the following first scenario transactions 412 that occur when User1 successfully registers new device 114. At 414, new device 114 successfully pairs with pairing device 120, which is near the new device. To do this, User1 powers-on/boots-up new device 114, which presents a prompt to pair the new device. Responsive to the prompt, User1 initiates pairing of new device114 with pairing device 120, which leads to successful pairing of the two devices. Any known or hereafter developed pairing technique may be employed. In one example, the two devices perform ultrasound pairing, i.e., exchange ultrasound signals to pair with each other. In another example, the two devices may exchange a preconfigured QR code to pair with each other. New device 114 acquires information identifying User1 (i.e., the userID for User1) through pairing device 120. The userID may be in the form of the username, the email address, or the user account ID of User1. After pairing, at 416, new device 114 reads its hardware ID and sends to administrative portal 108 a full provisioning request that includes/reports the hardware ID of new device 114 (also referred to as the "reported hardware ID") and the userID for User1 (also referred to as the "reported userID") acquired through pairing.

Upon receiving the full provisioning request from new device 114, at 417, administrative portal 108 determines whether the reported hardware ID and the reported userID respectively match the previously linked hardware ID and userID. A match between the reported userID and the linked userID is confirmed when the reported userID is any reported form of userID for User1 (e.g., email, username, or user account ID) and the linked userID is also any form of userID for User1 (e.g., email, username, or user account ID). For example, a match between userIDs is confirmed even when the reported userID for User1 is a username and the linked userID for User1 is an account ID for User1.

Figure 4B:
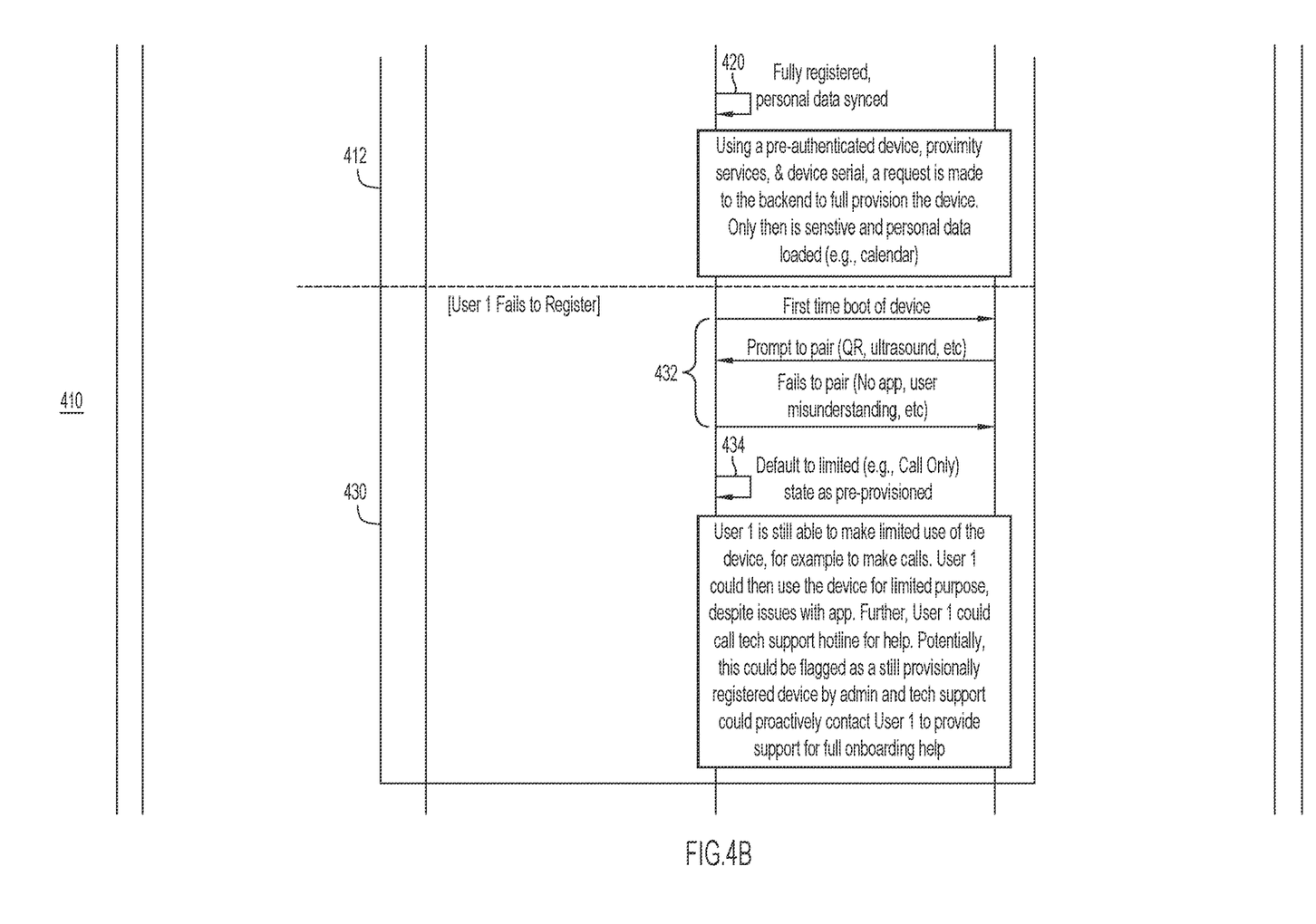

When there is a match, at 418, administrative portal 108 configures new device 114 with a full access token linked to/associated with User1. That is, administrative portal 108 sends the full access token to new device 114, and the new device installs the full access token. The full access token overrides the limited use token. The full access token enables full call functions on new device 114. The full access token also grants to new device 114 full access to user account 118, i.e., to all the account information stored in the user account. Referring to FIG. 4B, using the full access token, at 420, new device 114 synchronizes to (e.g., downloads at least some of) the account information in user account 118. In an example, the full access token may be configured as an Oauth token that can be used to access account information from user account 118 using Oauth request/response techniques.

When there is not a match between the reported hardware ID and userID and the linked hardware ID and userID, respectively, administrative portal 108 does not send the full access token to new device 114, which prevents the new device from accessing user account 118 and leaking sensitive personal data of User1.

First alternative transactions 410 include the following second scenario transactions 430 that occur when User1 fails to register new device 114. At 432, new device 114 fails to pair with any pairing device (e.g., with pairing device 120). For example, User1 powers-on/boots-up new device 114, and the new device presents the prompt to pair the new device. In this case, new device 114 fails to pair with any pairing device, and as a result the new device does not receive the full access token from administrative portal 108. At 434, new device 114 remains limited to the basic call functions, and is unable to fully access user account 118. Using the basic call functions on new device 114, User1 may call IT support for guidance on registering the new device. Alternatively, administrative portal 108 may flag new device 114 as being provisionally registered, and submit a request to IT support to call User1 on the new device.

Figure 4C:
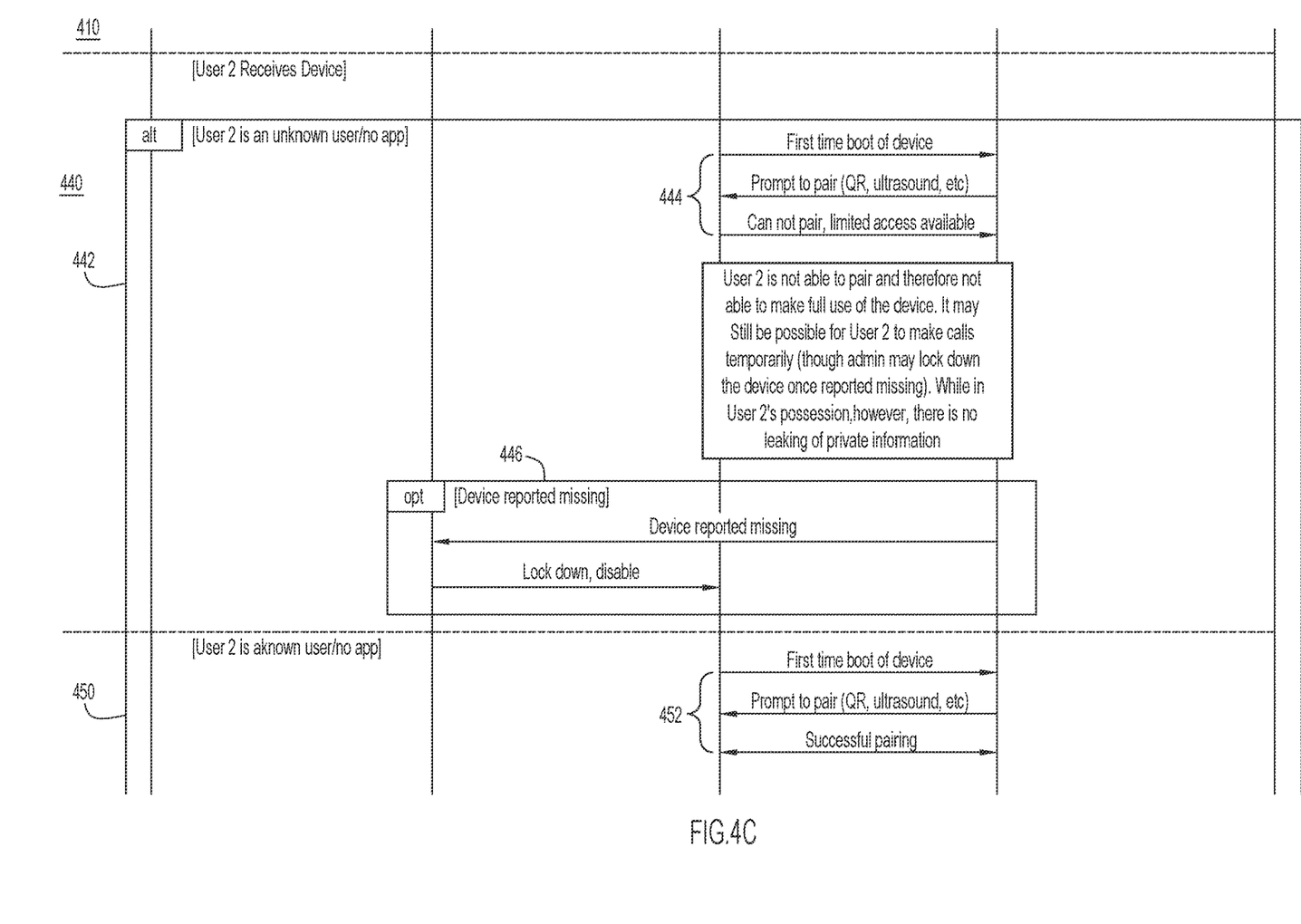

With reference to FIG. 4C, the post-shipment provisioning transactions also include second alternative transactions 440 that occur when unauthorized User2 receives new device 114 instead of User1. Second alternative transactions 440 include the following third scenario transactions 442 that occur when User2 is an unknown user (i.e., is unknown to administrative portal 108). At 444, new device 114 fails to pair with any pairing device. For example, User2 powers-on/boots-up new device 114, and the new device presents the pairing prompt mentioned above. In this case, new device 114 fails to pair with any pairing device, and the new device does not receive the full access token from administrative portal 108. New device 114 remains limited to the basic calling functions, and is unable to access user account 118. Thus, User2 may make use new device 114 for the basic call functions, but cannot access user account 118.

In another option, at 446, User1 reports to administrative portal 108 that User1 did not receive new device 114, i.e., that the new device is missing. In response, administrative portal 108 sends a lock-down command to new device 114 that disables (i.e., locks-down) the new device. In other words, administrative portal 108 remotely disables new device 114. Upon receiving the lock-down command, new device 114 locks itself.

Figure 4D:
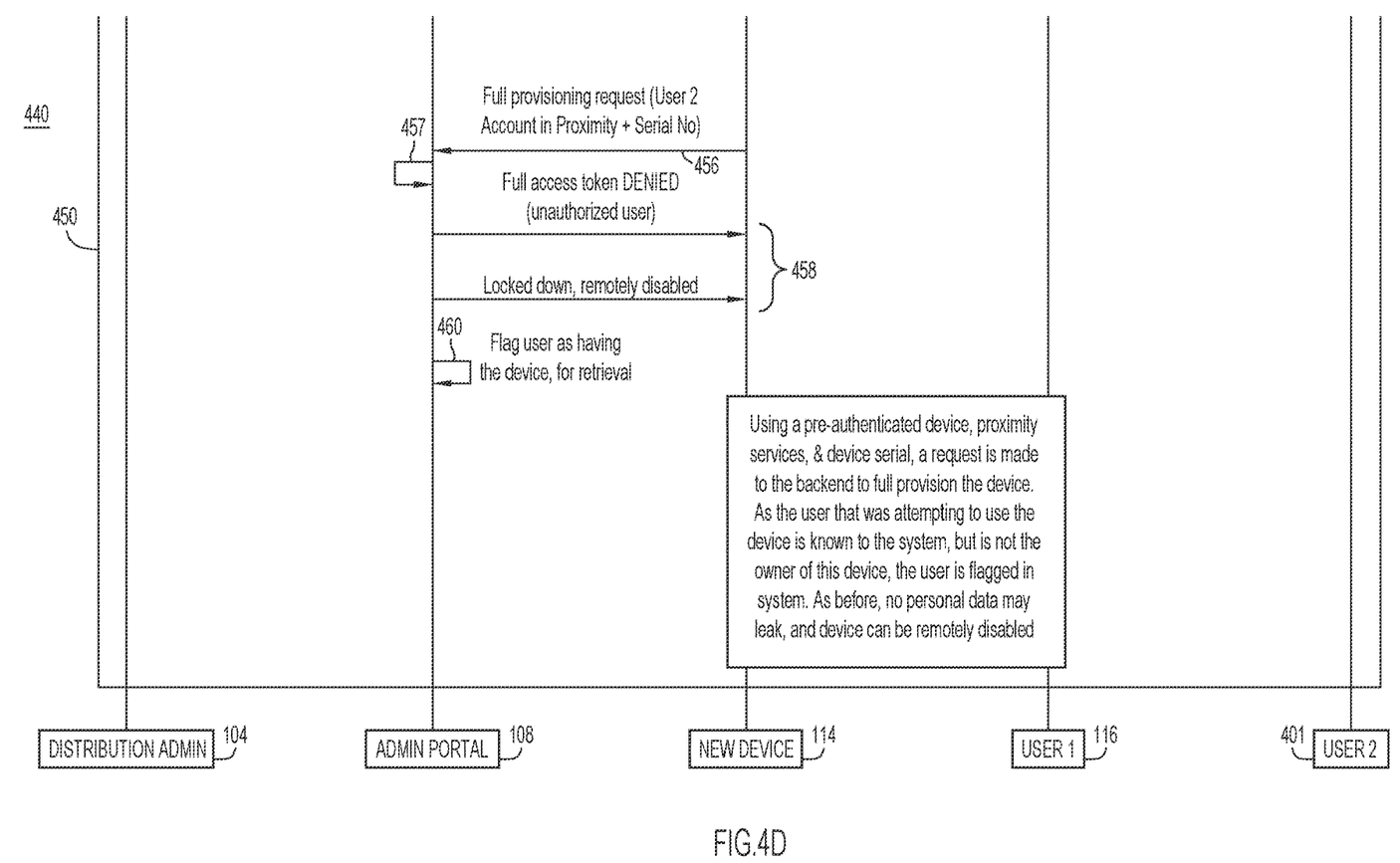

Second alternative transactions 440 include the following fourth scenario transactions 450 that occur when User2 is a known user (i.e., administrative portal recognizes User2). At 452, new device 114 successfully pairs with a pairing device operated by User2 that is different from pairing device 120. For example, User2 powers-on/boots-up new device 114, and the new device presents the pairing prompt. Responsive to the prompt, User2 initiates pairing of new device 114 with the nearby pairing device operated by User2, which leads to successful pairing of the two devices. New device 114 acquires a userID for User2 (which is different from the userID for User1) from the pairing device. With reference to FIG. 4D, after pairing, at 456, new device 114 sends to administrative portal 108 a full provisioning request that includes/reports the hardware ID of new device 114 and the userID for User2 acquired through pairing.

Upon receiving the full provisioning request from new device 114, at 457, administrative portal 108 determines that the reported hardware ID for new device 114 and the reported userID for User2 do not match the previously linked hardware ID for the new device and the userID for User1. In this case, there is no match because the userIDs differ-User2 is an unauthorized user for new device 114. Responsive to the failure to match, at 458, administrative portal 108 denies the full access token and disables/locks-down new device 114. At 460, administrative portal 108 flags User2 (who is known) as having new device 114, and submits an order to retrieve the new device from User2.

In the scenarios described above, a mismatch between the reported userID and the userID initially linked to the hardware identifier of the new device represents an invalid activation attempt. Upon detecting the invalid activation attempt, administrative portal 108 provides an alarm to an administrator and/or the user (i.e., the intended user) indicating that an attempt has been made to activate the new device by an unauthorized user. The alarm may indicate an IP address of the new device, the hardware ID of the new device, the username of the user, an organization ID of the user, and an organization ID or other userID of the unauthorized user, if known. Additionally, a device management rule configured on administrative portal 108 may be triggered to fully lock the new device.

Figure 5:
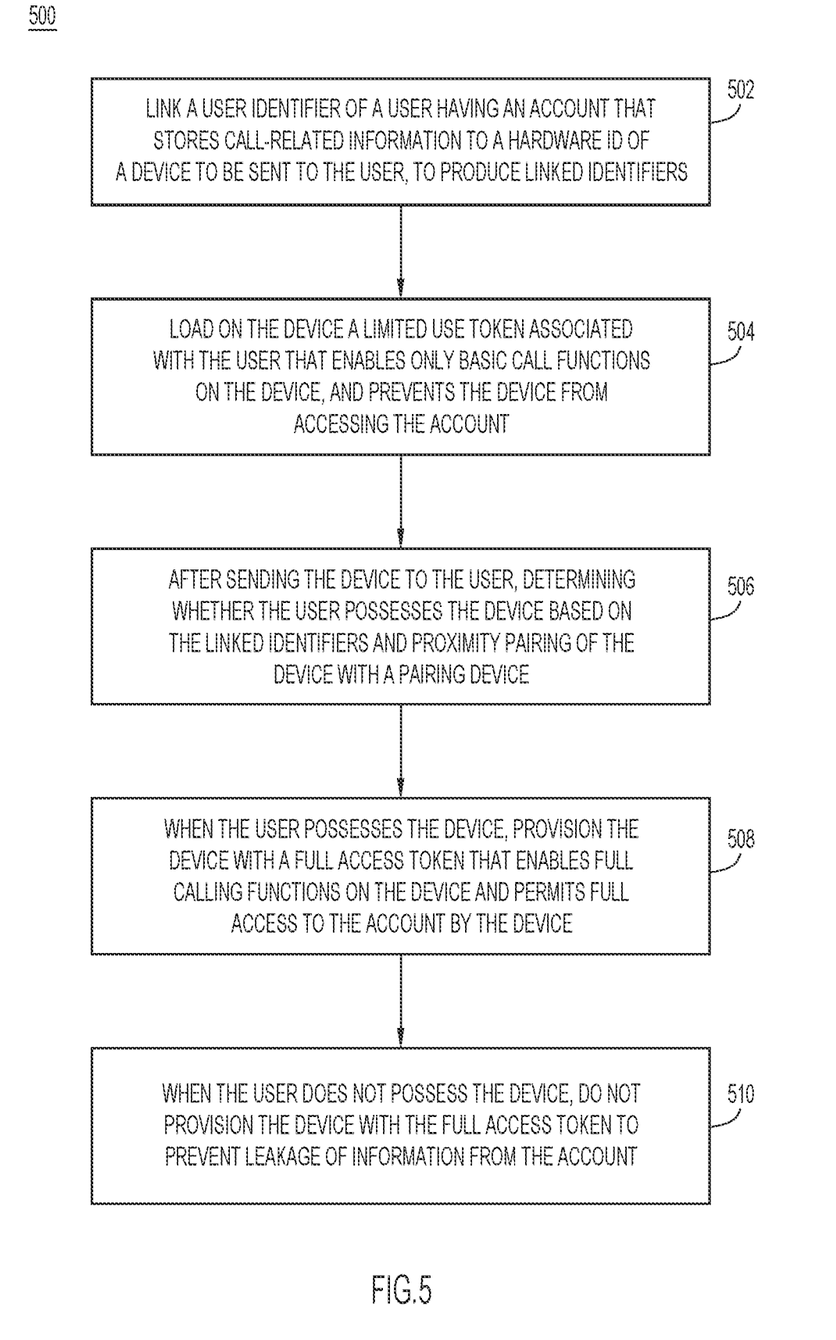
FIG. 5 is a method of pre-provisioning a new device to prevent personal data leakage during deployment of the new device to the intended user, according to an example embodiment.

FIG. 5 is a flowchart of an example method 500 of pre-provisioning a new device (also referred to simply as a "device") to prevent personal account data leakage during deployment of the device to a user intended (i.e., an intended end user) for the device. Method 500 may be performed in network environment 100, primarily by administrative portal 108 operating in connection with distribution administrator 104 (collectively referred to as a "control entity" or "back-end") and the new device. In the ensuing description of FIG. 5, the new device is referred to simply as the "device."

During a pre-provisioning phase that occurs before the device is sent to the user, at 502, the control entity links/associates information identifying the user to a hardware identifier of the device to produce linked identifiers. The user has a cloud-based account (i.e., a user account) that stores personal and call-related account information. In an example, the control entity links a user identifier of the user (e.g., a username, an account identifier, or an email address) to the hardware identifier.

Also during the pre-provisioning phase, at 504, the control entity load/installs/programs into memory of the device a limited use token associated with (i.e., linked to) the user that enables only basic call functions on the device, and prevents the device from accessing full (or, in some cases, any) information from the account. The control entity may also install on the device a proximity pairing application that enables proximity pairing of the device with a pairing device near the device, based on an exchange between the two devices of one of a QR code, pairing ultrasound signals, and the like.

After the device has been sent to the user (e.g., after sending the device to the user), at 506, the control entity determines whether the user possesses the device by comparing the linked identifiers against information obtained from the device (e.g., reported identifiers) from proximity pairing the device with the pairing device that is nearby. The pairing device has access to information indicative of a user identifier of a user, which may or may not be the intended user.

To determine whether the user possesses the device, the control entity may perform the following operations. The control entity receives from the device a full provisioning request (sent by the device) that carries a reported hardware identifier and a reported user identifier acquired by the device from the proximity pairing. In response, the control entity determines/evaluates whether the reported hardware identifier and the reported user identifier match the linked hardware identifier and user identifier. When there is a match, the control entity confirms that the user possesses the device. When there is not a match, the control entity confirms that the user does not possess the device.

When the user possesses the device, at 508, the control entity provisions the device with a full access token that enables full call functions on the device and grants/permits full access to the account (i.e., full account access) by the device. The full call functions include receiving and making calls from and to any number.

On the other hand, when the user does not possess the device, at 510, the control entity does not provision the device with the full access token in order to prevent leakage of information from the account. The control function may remotely disable the device. The control function may provide an alarm to an administrator indicating that an attempt has been made to activate the device by an unauthorized user. The alarm may also indicate an identity of the user, an IP address of the device, and so on.

In summary, according to embodiments presented herein, a control entity pre-associates a hardware identifier of a new device (that is to be shipped to a user) with a user account of the user. Before shipping the new device to the user, the control entity installs on the new device only a provisional/limited use token associated with the user. The limited use token prevents the new device from accessing the user account. After the control entity ships the new device to the user, the control entity exchanges information with the new device, and access the pre-associated information, to verify that the user has paired the new device with a nearby device that has access to information identifying the user. When verifying is successful, the control entity grants all user account access to the new device. When verifying is unsuccessful, the control entity does not grant user account access to the new device, which prevents user account data leakage. The control entity alerts administrators that the new device may be intercepted or otherwise subject to unauthorized use. The embodiments improve upon existing pre-provisioning models for new devices.

Figure 6:
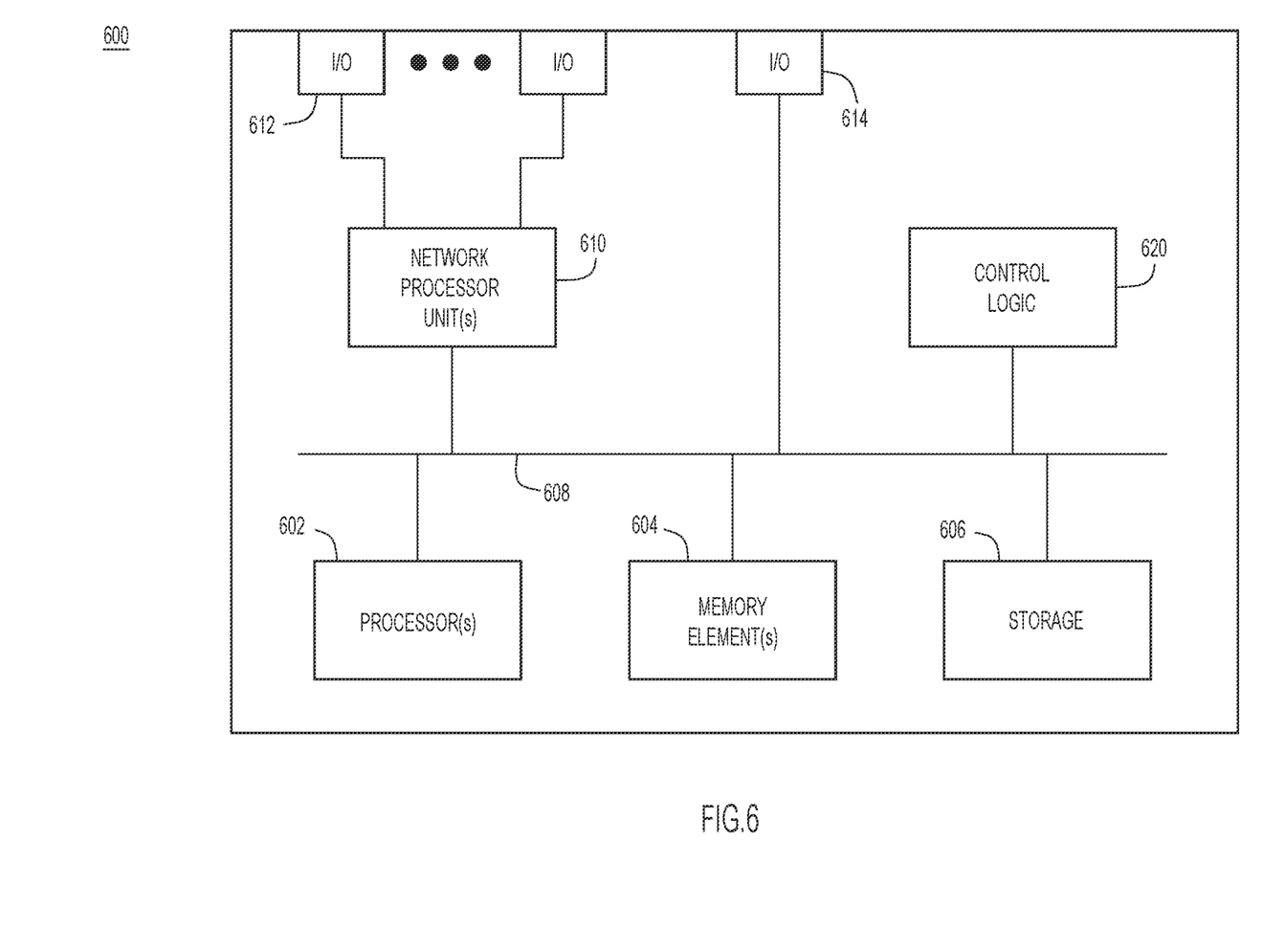
FIG. 6 illustrates a hardware block diagram of a computing device that may perform functions associated with operations performed in the embodiments presented herein, according to an example embodiment.

Referring to FIG. 6, FIG. 6 illustrates a hardware block diagram of a computing device 600 that may perform functions associated with operations discussed herein in connection with the techniques depicted in FIGS. 1-5. In various embodiments, a computing device or apparatus, such as computing device 600 or any combination of computing devices 600, may be configured as any entity/entities as discussed for the techniques depicted in connection with FIGS. 1-5 in order to perform operations of the various techniques discussed herein. For example, computing device may represent each of the entities of network environment 100, including administrative portal 108, distribution administrator 104, the control entity/device deployment entity, new device 114, and pairing device 120 individually and/or collectively.

In at least one embodiment, the computing device 600 may be any apparatus that may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, in some aspects, the techniques described herein relate to a method including: at a control entity configured to communicate with a network: linking a user identifier of a user having an account for call-related information to a hardware identifier of a device to be sent to the user, to produce linked identifiers; loading on the device a limited use token associated with the user that enables only basic call functions on the device, and prevents the device from accessing the account; determining whether the user possesses the device based on the linked identifiers and proximity pairing of the device with a pairing device; and based on determining, either provisioning the device with a full access token that enables full calling functions on the device and grants full access to the account by the device, or not provisioning the device with the full access token to prevent access to the account.

In some aspects, the techniques described herein relate to a method, further including: when the user possesses the device, provisioning the device with the full access token; and when the user does not possess the device, not provisioning the device with the full access token to prevent leakage of account information.

In some aspects, the techniques described herein relate to a method, further including, at the control entity: when the user does not possess the device, remotely disabling the device.

In some aspects, the techniques described herein relate to a method, further including, at the control entity: when the user does not possess the device, providing an alarm that indicates: an attempt has been made to activate the device by an unauthorized user; and an identity of the user.

In some aspects, the techniques described herein relate to a method, wherein determining includes comparing the linked identifiers against information obtained from the device from the proximity pairing.

In some aspects, the techniques described herein relate to a method, wherein determining further includes: upon receiving, from the device, a full provisioning request that carries a reported hardware identifier and a reported user identifier acquired from the pairing device through proximity pairing, evaluating whether the reported hardware identifier and the reported user identifier match the hardware identifier and the user identifier, respectively; when there is a match, confirming that the user possesses the device as paired; and when there is not the match, confirming that the user does not possess the device.

In some aspects, the techniques described herein relate to a method, wherein the account includes: an account identifier; a username; recent call history; a calendar; and billing information.

In some aspects, the techniques described herein relate to a method, further including, at the control entity: before the device has been sent to the user, installing on the device a proximity pairing application that enables proximity pairing based on exchanging, with the pairing device, one of a quick response (QR) code and pairing ultrasound signals.

In some aspects, the techniques described herein relate to a method, wherein the device includes one of an Internet Protocol (IP) phone, a cell phone, and a video conference device.

In some aspects, the techniques described herein relate to a method, wherein the user identifier is associated with an account identifier for the account.

In some aspects, the techniques described herein relate to a method, wherein the basic call functions are limited to receiving phone calls, calling an emergency service, and calling a preloaded information technology (IT) help line for user support for activating the device.

In some aspects, the techniques described herein relate to an apparatus including: a network input/output interface to communicate with a network; and a processor coupled to the network input/output interface and configured to perform: linking a user identifier of a user having an account for call-related information to a hardware identifier of a device to be sent to the user, to produce linked identifiers; loading on the device a limited use token associated with the user that enables only basic call functions on the device, and prevents the device from accessing the account; determining whether the user possesses the device based on the linked identifiers and proximity pairing of the device with a pairing device; and based on determining, either provisioning the device with a full access token that enables full calling functions on the device and grants full access to the account by the device, or not provisioning the device with the full access token to prevent access to the account.

In some aspects, the techniques described herein relate to an apparatus, wherein the processor is further configured to perform: when the user possesses the device, provisioning the device with the full access token; and when the user does not possess the device, not provisioning the device with the full access token to prevent leakage of account information.

In some aspects, the techniques described herein relate to an apparatus, wherein the processor is further configured to perform: when the user does not possess the device, remotely disabling the device.

In some aspects, the techniques described herein relate to an apparatus, wherein the processor is further configured to perform: when the user does not possess the device, providing an alarm that indicates: an attempt has been made to activate the device by an unauthorized user; and an identity of the user.

In some aspects, the techniques described herein relate to an apparatus, wherein the processor is configured to perform determining by comparing the linked identifiers against information obtained from the device from the proximity pairing.

In some aspects, the techniques described herein relate to an apparatus, the processor is further configured to perform determining by: upon receiving, from the device, a full provisioning request that carries a reported hardware identifier and a reported user identifier acquired from the pairing device through proximity pairing, evaluating whether the reported hardware identifier and the reported user identifier match the hardware identifier and the user identifier, respectively; when there is a match, confirming that the user possesses the device as paired; and when there is not the match, confirming that the user does not possess the device.

In some aspects, the techniques described herein relate to a non-transitory computer medium encoded with instructions that, when executed by a processor, cause the processor to perform: linking a user identifier of a user having an account for call-related information to a hardware identifier of a device to be sent to the user, to produce linked identifiers; loading on the device a limited use token associated with the user that enables only basic call functions on the device, and prevents the device from accessing the account; determining whether the user possesses the device based on the linked identifiers and proximity pairing of the device with a pairing device; and based on determining, either provisioning the device with a full access token that enables full calling functions on the device and grants full access to the account by the device, or not provisioning the device with the full access token to prevent access to the account.

In some aspects, the techniques described herein relate to a non-transitory computer medium, further including instructions to cause the processor to perform: when the user possesses the device, provisioning the device with the full access token; and when the user does not possess the device, not provisioning the device with the full access token to prevent leakage of account information.

In some aspects, the techniques described herein relate to a non-transitory computer medium, further including instructions to cause the processor to perform: when the user does not possess the device, remotely disabling the device.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   at a control entity configured to communicate with a network:
   linking a user identifier of a user having an account for call-related information to a hardware identifier of a device to be sent to the user, to produce linked identifiers;
   loading on the device a limited use token associated with the user that enables only basic call functions on the device, and prevents the device from accessing the account;
   determining whether the user possesses the device based on the linked identifiers and proximity pairing of the device with a pairing device; and
   based on determining, either provisioning the device with a full access token that enables full calling functions on the device and grants full access to the account by the device, or not provisioning the device with the full access token to prevent access to the account.

2. The method of claim 1, further comprising:
   when the user possesses the device, provisioning the device with the full access token; and
   when the user does not possess the device, not provisioning the device with the full access token to prevent leakage of account information.

3. The method of claim 1, further comprising, at the control entity:
   when the user does not possess the device, remotely disabling the device.

4. The method of claim 3, further comprising, at the control entity:
   when the user does not possess the device, providing an alarm that indicates:
      an attempt has been made to activate the device by an unauthorized user; and
      an identity of the user.

5. The method of claim 1, wherein determining includes comparing the linked identifiers against information obtained from the device from the proximity pairing.

6. The method of claim 5, wherein determining further includes:
   upon receiving, from the device, a full provisioning request that carries a reported hardware identifier and a reported user identifier acquired from the pairing device through the proximity pairing, evaluating whether the reported hardware identifier and the reported user identifier match the hardware identifier and the user identifier, respectively;
   when there is a match, confirming that the user possesses the device as paired; and
   when there is not the match, confirming that the user does not possess the device.

7. The method of claim 1, wherein the account includes: an account identifier; a username; recent call history; a calendar; and billing information.

8. The method of claim 1, further comprising, at the control entity:
   before the device has been sent to the user, installing on the device a proximity pairing application that enables the proximity pairing based on exchanging, with the pairing device, one of a quick response (QR) code and pairing ultrasound signals.

9. The method of claim 1, wherein the device includes one of an Internet Protocol (IP) phone, a cell phone, and a video conference device.

10. The method of claim 1, wherein the user identifier is associated with an account identifier for the account.

11. The method of claim 1, wherein the basic call functions are limited to receiving phone calls, calling an emergency service, and calling a preloaded information technology (IT) help line for user support for activating the device.

12. An apparatus comprising:
   a network input/output interface to communicate with a network; and
   a processor coupled to the network input/output interface and configured to perform:
      linking a user identifier of a user having an account for call-related information to a hardware identifier of a device to be sent to the user, to produce linked identifiers;
      loading on the device a limited use token associated with the user that enables only basic call functions on the device, and prevents the device from accessing the account;

determining whether the user possesses the device based on the linked identifiers and proximity pairing of the device with a pairing device; and based on determining, either provisioning the device with a full access token that enables full calling functions on the device and grants full access to the account by the device, or not provisioning the device with the full access token to prevent access to the account.

13. The apparatus of claim 12, wherein the processor is further configured to perform:

when the user possesses the device, provisioning the device with the full access token; and when the user does not possess the device, not provisioning the device with the full access token to prevent leakage of account information.

14. The apparatus of claim 12, wherein the processor is further configured to perform:

when the user does not possess the device, remotely disabling the device.

15. The apparatus of claim 14, wherein the processor is further configured to perform:

when the user does not possess the device, providing an alarm that indicates:

an attempt has been made to activate the device by an unauthorized user; and an identity of the user.

16. The apparatus of claim 12, wherein the processor is configured to perform determining by comparing the linked identifiers against information obtained from the device from the proximity pairing.

17. The apparatus of claim 16, the processor is further configured to perform determining by:

upon receiving, from the device, a full provisioning request that carries a reported hardware identifier and a reported user identifier acquired from the pairing device through the proximity pairing, evaluating whether the reported hardware identifier and the reported user identifier match the hardware identifier and the user identifier, respectively;

when there is a match, confirming that the user possesses the device as paired; and when there is not the match, confirming that the user does not possess the device.

18. A non-transitory computer medium encoded with instructions that, when executed by a processor, cause the processor to perform:

linking a user identifier of a user having an account for call-related information to a hardware identifier of a device to be sent to the user, to produce linked identifiers;

loading on the device a limited use token associated with the user that enables only basic call functions on the device, and prevents the device from accessing the account;

determining whether the user possesses the device based on the linked identifiers and proximity pairing of the device with a pairing device; and based on determining, either provisioning the device with a full access token that enables full calling functions on the device and grants full access to the account by the device, or not provisioning the device with the full access token to prevent access to the account.

19. The non-transitory computer medium of claim 18, further comprising instructions to cause the processor to perform:

when the user possesses the device, provisioning the device with the full access token; and when the user does not possess the device, not provisioning the device with the full access token to prevent leakage of account information.

20. The non-transitory computer medium of claim 18, further comprising instructions to cause the processor to perform:

when the user does not possess the device, remotely disabling the device.

* * * * *